United States Patent [19]

Kleppner et al.

[11] Patent Number: 5,564,396
[45] Date of Patent: Oct. 15, 1996

[54] SYSTEM FOR FEEDING FUEL FROM A SUPPLY TANK TO AN INTERNAL COMBUSTION ENGINE

[75] Inventors: Stephan Kleppner, Bretten; Kurt Frank, Schorndorf, both of Germany

[73] Assignee: Robert Bosch GmbH, Stuttgart, Germany

[21] Appl. No.: 564,160

[22] PCT Filed: Apr. 8, 1995

[86] PCT No.: PCT/DE95/00478

§ 371 Date: Dec. 21, 1995

§ 102(e) Date: Dec. 21, 1995

[87] PCT Pub. No.: WO95/29075

PCT Pub. Date: Nov. 2, 1995

[30] Foreign Application Priority Data

Apr. 23, 1994 [DE] Germany .......... 44 14 281.1

[51] Int. Cl.⁶ ............. F02M 37/22; F02M 37/10
[52] U.S. Cl. ............................. 123/509
[58] Field of Search .................. 123/509, 514

[56] References Cited

U.S. PATENT DOCUMENTS

| | | | |
|---|---|---|---|
| 5,036,822 | 8/1991 | Kojima | 123/509 |
| 5,070,849 | 12/1991 | Rich et al. | 123/509 |
| 5,146,901 | 9/1992 | Jones | 123/509 |
| 5,170,764 | 12/1992 | Tuckey | 123/509 |
| 5,195,494 | 3/1993 | Tuckey | 123/514 |
| 5,330,475 | 7/1994 | Woodward et al. | 123/509 |
| 5,392,750 | 2/1995 | Laue et al. | 123/509 |
| 5,415,146 | 5/1995 | Tuckey | 123/509 |

FOREIGN PATENT DOCUMENTS

| | | |
|---|---|---|
| 0579540 | 1/1994 | European Pat. Off. . |
| 2270268 | 3/1994 | United Kingdom . |

*Primary Examiner*—Thomas N. Moulis
*Attorney, Agent, or Firm*—Edwin E. Greigg; Ronald E. Greigg

[57] ABSTRACT

A system for feeding fuel from a supply tank to an internal combustion engine, having a feed unit which is preceded by a disklike fuel filter and followed by an annular fuel filter. For the sake of simplified installation of the feed system in the tank, a common filter housing is provided, with which the feed unit, the upstream disk filter and the downstream ring filter are integrated.

18 Claims, 2 Drawing Sheets

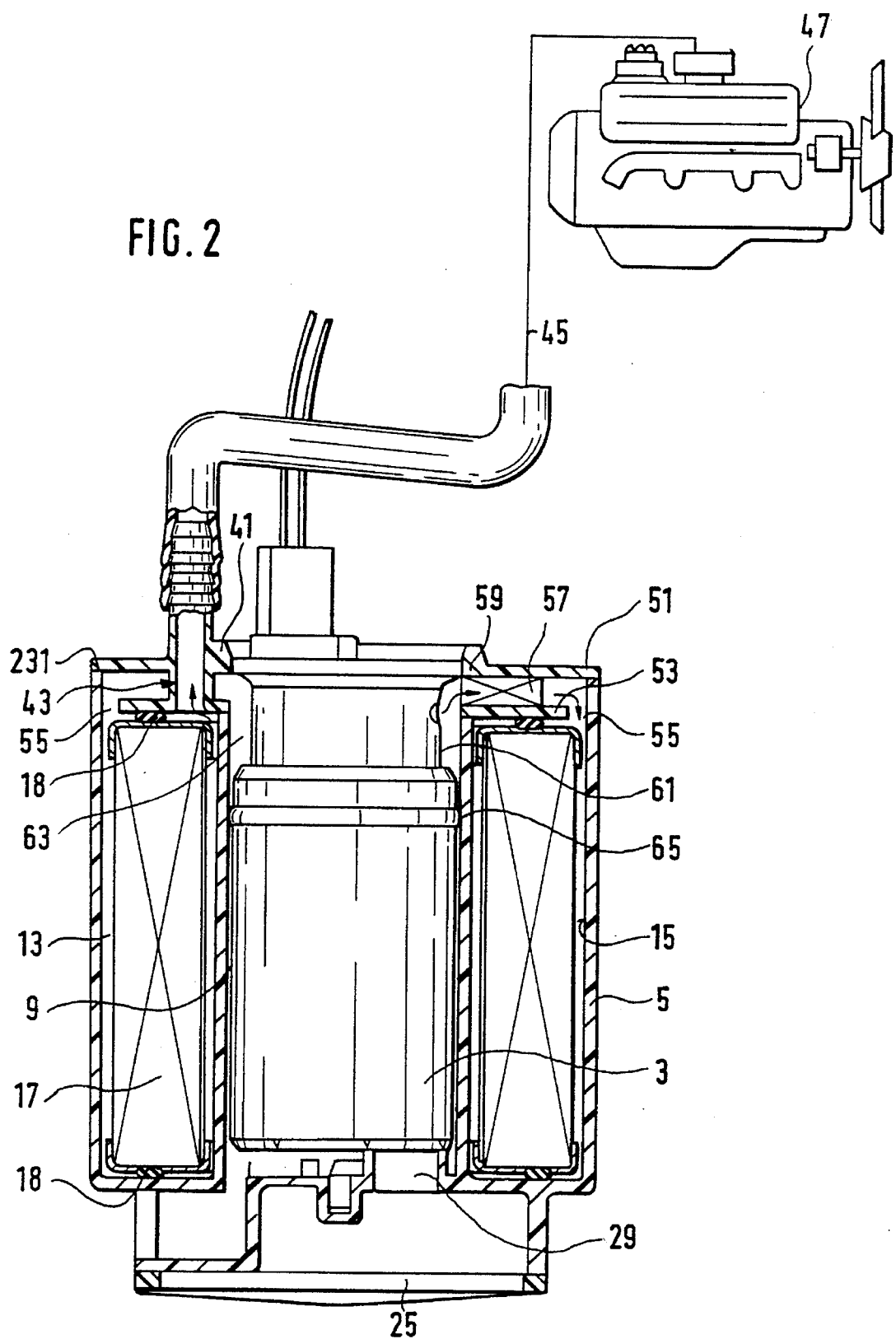

5,564,396

SYSTEM FOR FEEDING FUEL FROM A SUPPLY TANK TO AN INTERNAL COMBUSTION ENGINE

PRIOR ART

The invention is based on a system for feeding fuel from a supply tank to an internal combustion engine. In one such system, known from German Patent 37 04 191, a feed unit inserted in a supply tank and formed by an electrically driven feed pump pumps fuel from the supply tank to an engine via a supply line. To that end, the feed unit is inserted into a tubular guide part secured to the supply tank and on its lower end has an intake stub protruding into the bottom region of the tank and on its upper end has a pressure connection communicating with the supply line. To avoid damage to the feed unit from dirt particles in the fuel, the feed unit is preceded by a fuel filter mounted on the intake stub. To enable reliable avoidance of damage to the engine to be supplied as well, it is also known from the prior art in fuel feed units for internal combustion engines to provide a second fuel filter upstream of the engine in the supply line; however, this separate arrangement of the two filters has the disadvantage of relatively major construction and installation expense.

The system for feeding fuel from a supply tank to an internal combustion engine according to the invention has the advantage over the prior art that the fuel filters located upstream and downstream of the feed unit, for the sake of the most reliable possible filtering of the fuel, are received in a common filter housing, into which the feed unit is moreover simply also inserted. In this way, the entire feed system can be preinstalled outside the supply tank and is then merely inserted as a unit into the supply tank, which considerably lessens the effort and expense of installation and manufacture compared with known embodiments.

Especially advantageously, the filter housing can be embodied such that the tubular guide portion of the feed unit forms an inner first chamber in the common filter housing and is enclosed by the wall of the common filter housing in such a way as to form a second outer chamber between the guide part and the filter housing wall, into which chamber a filter is inserted. This filter, in accordance with the shape of the second chamber, is advantageously embodied as a ring filter. Another advantage from a production standpoint is attained by the one-piece embodiment of the filter housing and the guide part, with the two parts being joined together by an end wall that is also integral with them and that on one face end closes off the filter housing. This end wall has a guide bore that receives the intake stub and is partially indented inward in cup-shaped fashion; this indentation advantageously enables the reception of the disklike second filter, which thus defines an antechamber for the intake stub inside the end wall.

The pressure connections are advantageously provided on a closure cap that closes off the filter housing on the side remote from the closed end wall; by way of these pressure connections, the pressure connection of the feed unit can be joined to the ring filter and the ring filter can be joined to the supply line. It is especially advantageous for the cap to be embodied in double-walled fashion, such that the hydraulic communication between the pressure connection of the feed unit and the ring filter takes place by way of the closure cap, so that hydraulic connection lines additionally mounted to the outside of the closure cap can be dispensed with, which further reduces the production cost.

Further advantages and advantageous features of the subject of the invention may be learned from the drawing, description and claims.

BRIEF DESCRIPTION OF THE DRAWINGS

Two exemplary embodiments of the fuel feed system according to the invention are shown in the drawings and will be described in further detail below.

FIG. 2 shows a second exemplary embodiment similar to the view of the first, with a double-walled closure cap.

DESCRIPTION OF THE EXEMPLARY EMBODIMENTS

Figure 1:
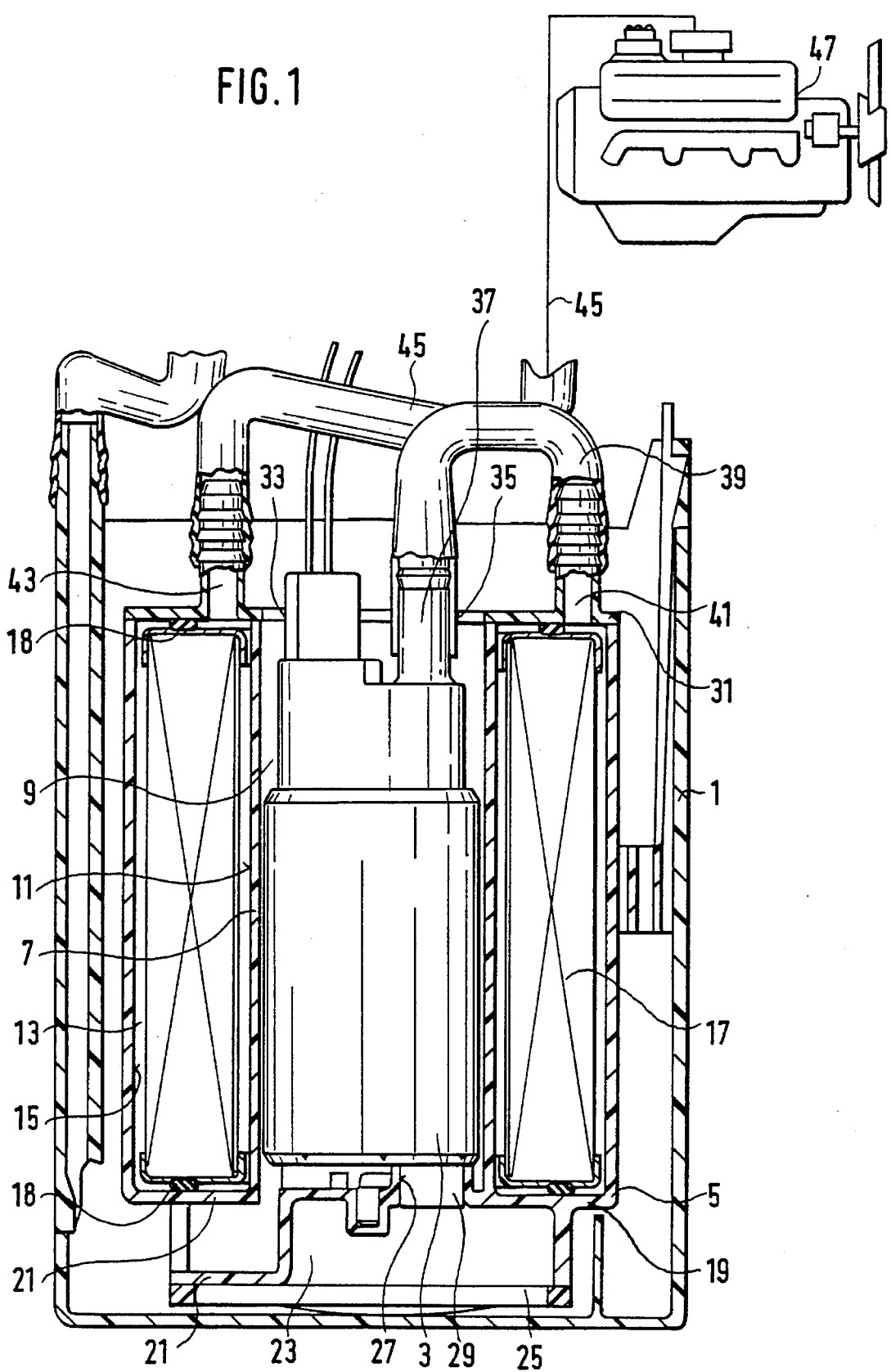
FIG. 1 shows a first exemplary embodiment of the feed system in a simplified section through the common filter housing, in which the hydraulic communication between the ring filter and the feed unit takes place via hydraulic lines on the closure cap.

The fuel feed system shown in FIG. 1 has a fuel supply tank 1, into which a common filter housing 5 is inserted that receives not only a feed unit 3 but also one fuel filter upstream of it and one fuel filter downstream of it. The substantially cylindrically embodied filter housing 5 has two chambers, of which a first chamber 9 is formed by a tubular guide part 7 disposed centrally in the filter housing 5, the inside diameter of which part is slightly larger than the outside diameter! of the likewise cylindrical feed unit 3 and into which the feed unit 3, preferably comprising an electrically driven feed pump, is inserted. The guide part 7, with its cylindrical circumferential wall 11, defines a second chamber 13 annularly surrounding the guide part 7 inside the filter housing 5, the outer boundary of which second chamber is formed by the inner wall 15 of the filter housing 5. Into this annular second chamber 13, a ring filter 17 adapted to the shape of the chamber 13 is inserted.

The filter housing 5, on its one end, has a cross-sectional reduction formed by way of a shoulder 19 that axially defines the second chamber 13, and at that shoulder it is closed off by means of an end wall 21, which extends in an extension of the shoulder 19 as far as the guide part 7 and thus connects the latter to the filter housing 5. The end wall 21, preferably embodied integrally with the filter housing 5 and the tubular guide part 7, is partially indented inward in cup-shaped fashion and thus forms an antechamber 23, which is closed off on its side remote from the end wall 21 by a disklike filter 25. The disklike filter 25 can be fitted into an annular flange provided on the end wall 21, or, as shown in FIG. 1, can be secured by a portion of its disklike face to the remaining, nonindented end wall region. The end wall 21 in its indented region furthermore has a guide bore 27, through which an intake stub 29 that forms the intake connection of the feed unit 3 protrudes into the antechamber 23. This guide bore 27, in a structurally simple manner, enables not only a connection of the feed unit 3 to the outside but moreover the positional fixation of the feed unit inside the tubular guide part 7.

On its end remote from the end wall 21, the common filter housing 5 is closed off by a closure cap 31, which rests sealingly on the axial ends of the guide part 7 and the filter housing 5 and thus, in the first exemplary embodiment, sealingly demarcates the first chamber 9 from the second chamber 13. In the closure cap 31 in the region of the first chamber 9, an opening 33 for the passage through it of the electrical connection of the feed unit 3 and the bore 31 for the passage through it of a pressure stub 37 forming the pressure connection of the feed unit 3 are provided. The pressure connection 37 communicates by means of a hydraulic connecting line 37 with an inlet stub 41 that discharges into the second chamber 13 and located on the closure cap 31. The closure cap 31 moreover, in the region of the second chamber 13, has an outlet stub 43 offset from the inlet stub 41 and likewise discharging into the second chamber 13; this outlet stub is adjoined by a supply line 45 leading to an internal combustion engine 47.

For secure axial bearing of the ring filter 17, one rubber-like sealing ring 18 is also provided on each of its axial end faces, the ring being fastened between the axial end faces of the ring filter 17 and the closure cap 31 on the one hand and the end wall 21 on the other. This sealing ring 18 also brings about a separation of the outer region, bordering the inlet stub 41, of the second chamber 13 and the inner region, bordering on the outlet stub 43, of the second chamber 13 and thus prevents a possible short-circuit flow between the inlet stub 41 and outlet stub 43, in order words without flowing through the ring filter 17.

The mode of operation of the feed system according to the invention is as follows.

During operation of the feed unit 3, fuel is aspirated via its intake stub 29 from the fuel-filled antechamber 23. This fuel on flowing in from the supply tank 1 to the antechamber 23, is filtered as it passes through the disklike filter 25 that defines the antechamber 23; the disklike filter 25 thus forms the fuel filter that precedes the feed unit 3. In the feed unit 3, the pressure of the fuel is raised in a known manner and the fuel flows at this elevated pressure via the pressure stub 37, the hydraulic line 39 and the inlet stub 41 into the second chamber 13. There the fuel flows radially through the ring filter 17, and the sealing ring 18, as described above, prevents a short circuit between the inlet stub 41 and the outlet stub 43. After flowing through the ring filter 17, the fuel emerges at the outlet stub 43 and from there flows to the engine 47 via the supply lines 45. The ring filter 17 thus forms the fuel filter located downstream of the feed unit 3, which averts damage to the engine and in particular its injection system from particles of dirt or abraided material in the fuel.

The second exemplary embodiment shown in FIG. 2 differs from the first exemplary embodiment in how the closure cap of the filter housing 5 is embodied and in terms of the fuel connections disposed on it, so that its description will be limited to these components that are modified compared with FIG. 1.

Here the closure cap 231 in FIG. 2 is embodied with double walls, having an upper wall 51 that sealingly closes off the filter housing 5 from the outside and a lower wall 53 axially offset from it and protruding into the filter housing 5; compared with the upper wall 51, the lower wall has a lesser radial extent, so that a cap 55 remains between it and the upper wall 15 of the filter housing, by way of which gap fuel can flow from the first chamber 9 into the second chamber 13; analogously to the first exemplary embodiment, the sealing ring 18 at the axial end faces of the ring filter 17 partitions off the inlet-side outer region of the second chamber 13 from its outlet-side inner region, so that a radial flow through the ring filter 17 is assured.

The upper and lower walls 51, 53 of the one-piece closure cap 231 are joined together by means of ribs 57 disposed between them and by means of the outlet stub 43 that discharges into the second chamber 13 and protrudes through the upper wall 51. The feed unit 3, on its high-pressure side remote from the intake stub 29, has at least one outlet opening 59 on its reduced-diameter housing portion 61 on the pressure side, through which the fuel fed emerges in the region of the closure cap 231 into the first chamber 9, which there forms a pressure chamber 63. From there, the fuel now flows inside the filter housing 5 via the double-walled closure cap 231 and the gap 55 into the second chamber 13, from which after flowing through the ring filter 17 it passes via the outlet stub 43 into the supply line 45 to reach the engine 47.

In order to avoid an uncontrolled outflow in this process of the fuel, which is at high pressure, from the pressure chamber 63 into the remaining portion, forming the intake side, of the first chamber 9, a sealing lip 65 is also provided on the circumference of the feed unit 3; it securely seals off the pressure chamber 63 from the remaining portion of the first chamber 9 and thus, together with the sealing closure between the edges of the closure cap 231 and the filter housing 5, prevents an uncontrolled outflow of fuel, which assures the highest possible efficiency of the feed system.

In an alternative to the embodiment of the cap shown, it is also possible for the upper wall 51 of the cap 231 to be embodied in closed form, and for the passage for the electrical connecting lines of the feed unit 3 to be provided at some other point of the filter housing 5. Compared with the first exemplary embodiment, the second exemplary embodiment has the advantage, in addition to simplified installation of the upstream and downstream fuel filter and of the feed unit in the common filter housing, that complicated hydraulic connecting lines on the closure cap can be dispensed with, which still further reduces the production cost of the overall feed system.

The foregoing relates to preferred exemplary embodiments of the invention, it being understood that other variants and embodiments thereof are possible within the spirit and scope of the invention, the latter being defined by the appended claims.

We claim:

1. A system for feeding fuel from a supply tank (1) to an internal combustion engine (47), comprising a feed unit (3) disposed in a tubular guide part (7), which unit has an intake connection communicating with the supply tank (1) and a pressure connection communicating at least indirectly with a supply line (45) to the engine (47), at least one fuel filter, provided on the feed unit (3), between the tank (1) and the engine (47), [characterized in that] the feed system has a first fuel filter upstream of the intake connection of the feed unit (3) in terms of the fuel flow direction and a second fuel filter downstream of the pressure connection of the feed unit (3) in the fuel flow direction, and to receive said first and second fuel filters one common filter housing (5) that receives the feed unit (3) is provided.

2. The system of claim 1, in which the common filter housing (5) has two chambers, of which a first chamber (9) is formed by the tubular guide part (7) that receives the feed unit (3), which part directly borders on a second chamber (13) which receives one of the fuel filters.

3. The system of claim 2, in which the common filter housing (5) encloses the tubular guide part (7) in such a way that the second chamber (13) is formed between a circumferential wall (11) of tubular guide part (7) and an inner wall (15) of the preferably cylindrical filter housing (5).

4. The system of claim 3, in which the common filter housing (5) and the tubular guide part (7) disposed in the filter housing are joined to one another by means of an end wall (21) that closes off the filter housing (5) on an axial end thereof, and the filter housing (5), guide part (7) and end wall (21) form a one-piece component.

5. The system of claim 4, in which the end wall (21) of the common filter housing (5) is at least in part indented inward in cup-shaped fashion, and on an open end receives the preferably disklike fuel filter (25), which thus defines an antechamber (23) on the cup-shaped portion of the end wall (21).

6. The system of claim 5, in which in the end wall (21) of the common filter housing (5) in the region of the cup-shaped indentation, a guide bore (27) is provided, through which an intake stub (29) that forms the intake connection of the feed unit (3) protrudes into the antechamber (23).

7. The system of claim 3, in which the one filter, disposed in the second chamber (13) of the filter housing (5) is embodied as a ring filter.

8. The system of claim 7, in which the second chamber (13) has an inlet opening communicating with the pressure connection of the feed unit (3) and an outlet opening, communicating with the supply line (45) to the engine (47).

9. The system of claim 8, in which, the axial end remote from the end wall (21) of the common filter housing (5) is closed off from the outside by a closure cap (31, 231).

10. The system of claim 8, in which the closure cap (31) seals off the second chamber (13) in the filter housing (5) entirely, and a through opening (35) is disposed in the closure cap (31) in the region of the first chamber (9), protruding through which opening is a pressure stub (37) forming the pressure connection of the feed unit (3), which s stub communicates by means of a hydraulic connecting line (39) with an inlet stub (41), forming the inlet opening into the second chamber (13), on the closure cap (31) in the region of the second chamber (13) and with an outlet stub (43) in the region of the second chamber (13), which stub is offset from the inlet stub (41) and forms the outlet opening from the second chamber (13), to which stub the supply line (45) to the engine (47) is connected.

11. The system of claim 8, in which the closure cap (231) is double-walled, having an upper wall (51) sealingly closing off the filter housing (5) from the outside and a lower wall (53), axially offset from the upper wall, with a lesser radial extent than the upper wall (51), wherein the walls (51, 53) communicate, by means of an outlet stub (43) forming the outlet opening of the second chamber (13) and ribs (57) disposed between the walls, in such a way that the first and second chambers (9, 13) of the filter housing (5) communicate hydraulically with one another via the annular gap remaining between the walls (51, 53) and via a gap (55) remaining between the lower wall (53) and the inner wall (15) of the filter housing (5).

12. The system of claim 11, in which the pressure connection of the feed unit (3) is embodied by a radial outlet opening (59) in the pressure-side housing portion (61) of the unit, by way of which opening the fuel fed in the feed unit (3) emerges, on the side bordering on the closure cap (231), into a pressure chamber (63) inside the first chamber (9).

13. The system of claim 5, in which the fuel filter upstream of the feed unit (3) is formed by the disklike filter (25) defining the antechamber (23), and the fuel filter downstream of the feed unit (3) is formed by the ring filter (17) disposed in the second chamber (13).

14. The system of claim 1, in which the feed unit (3) is embodied as an electrically driven feed pump, whose housing is guided in the form of a plug connection in the tubular guide part (7).

15. The system of claim 1, in which the common filter housing (5) is disposed inside the supply tank (1).

16. The system of claim 9, in which the closure cap (31) seals off the second chamber (13) in the filter housing (5) entirely, and a through opening (35) is disposed in the closure cap (31) in the region of the first chamber (9), protruding through which opening is a pressure stub (37) forming the pressure connection of the feed unit (3), which stub communicates by means of a hydraulic connecting line (39) with an inlet stub (41), forming the inlet opening into the second chamber (13), on the closure cap (31) in the region of the second chamber (13) and with an outlet stub (43) in the region of the second chamber (13), which stub is offset from the inlet stub (41) and forms the outlet opening from the second chamber (13), to which stub the supply line (45) to the engine (47) is connected.

17. The system of claim 9, in which the closure cap (231) is double-walled, having an upper wall (51) sealingly closing off the filter housing (5) from the outside and a lower wall (53), axially offset from the upper wall, with a lesser radial extent than the upper wall (51), wherein the walls (51, 53) communicate, by means of an outlet stub (43) forming the outlet opening of the second chamber (13) and ribs (57) disposed between the walls, in such a way that the first and second chambers (9, 13) of the filter housing (5) communicate hydraulically with one another via the annular gap remaining between the walls (51, 53) and via a gap (55) remaining between the lower wall (53) and the inner wall (15) of the filter housing (5).

18. The system of claim 7, in which the fuel filter upstream of the feed unit (3) is formed by the disklike filter (25) defining the antechamber (23), and the fuel filter downstream of the feed unit (3) is formed by the ring filter (17) disposed in the second chamber (13).

* * * * *